Jan. 12, 1965 T. F. MOSS 3,165,338
HOSE COUPLING
Filed Aug. 3, 1961 2 Sheets-Sheet 1
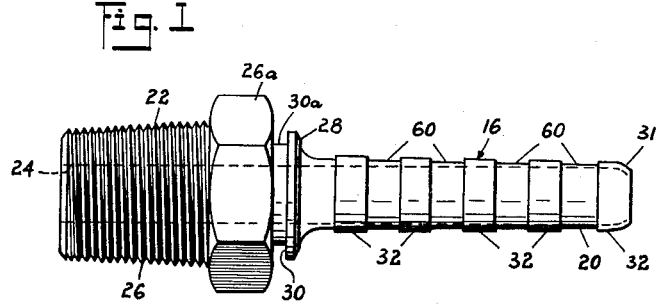
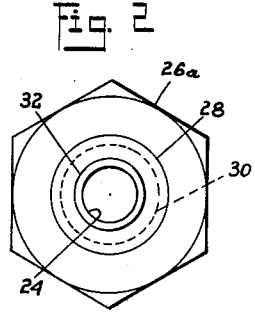
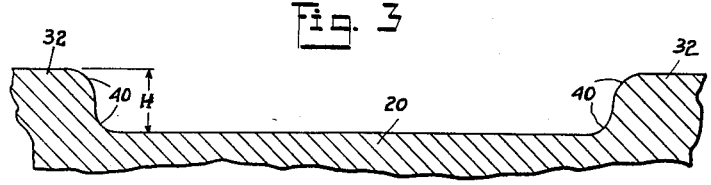
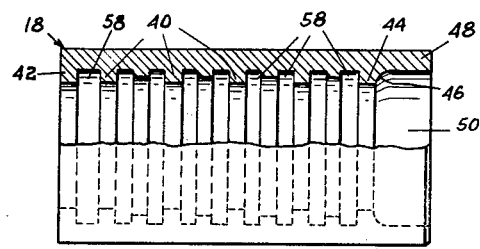
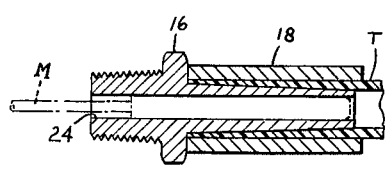
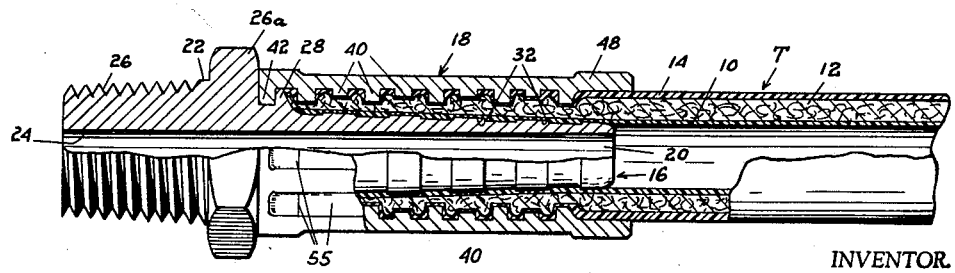
INVENTOR.
TREVOR F. MOSS
BY
Teare, Teare & Teare
ATTORNEYS Jan. 12, 1965 T. F. MOSS 3,165,338
HOSE COUPLING
Filed Aug. 3, 1961 2 Sheets-Sheet 2
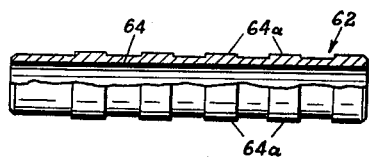
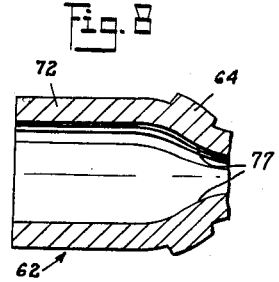
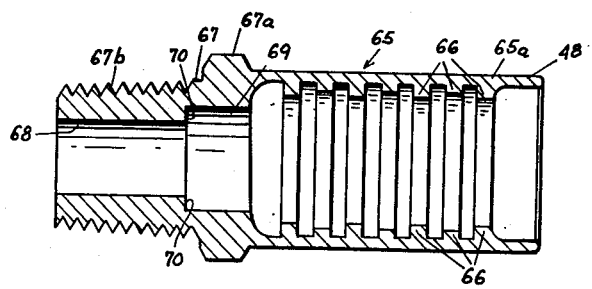
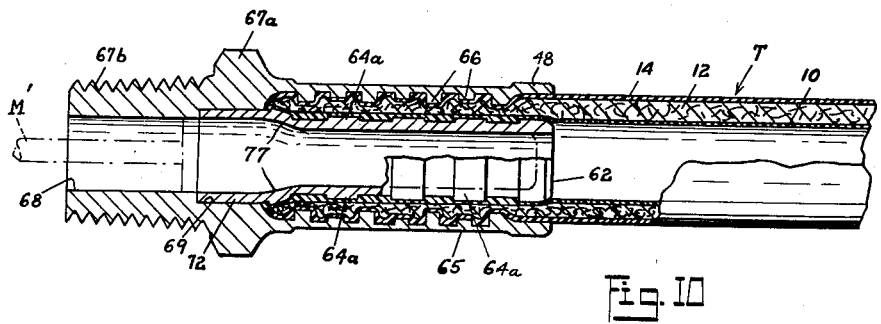
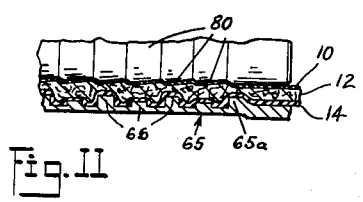
INVENTOR.
TREVOR F. MOSS
BY
Teare, Tetzer & Teare
ATTORNEYS

United States Patent Office 3,165,338
Patented Jan. 12, 1965

3,165,338
HOSE COUPLING
Trevor F. Moss, Mantua, Ohio, assignor to Samuel Moore & Co., Mantua, Ohio, a corporation of Ohio
Filed Aug. 3, 1961, Ser. No. 129,190
9 Claims. (Cl. 285—256)

This invention relates in general to a fitting or coupling for a hose, tubing, or the like, and more particularly to a fitting for composite thin walled tubing, used in connection with mechanical devices for transmission of fluid under relatively high pressures.

The fitting of the present invention is of the permanently attached type being secured as by means of swaging or crimping onto the hose or tubing, and which may be accomplished as by means of conventional machinery.

The flexible tubing product with which the fitting is adapted for use is of a thin walled, high strength, composite tubing type, and may comprise an inner thin walled tube of polymeric material, such as nylon or the like, at least one layer of fibrous reinforcing material disposed in tensioned, braided relation about the inner tube and forming a reinforcing sleeve, and an outer sheath of elastomeric plastic material covering the braided reinforcing material. Preferably, the reinforcing fibrous material is bonded to both the inner tube and to the outer sheath, and as by means of an adhesive. Reference may be had to the pending United States patent application of Robert E. Brumbach, Serial No. 124,448 filed July 17, 1961 for a more detailed description of a type of tubing or hose product which is particularly suitable for use with the coupling arrangement of the instant invention.

The problems associated with providing a satisfactory coupling for use with thinned walled, high pressure tubing are many, which tubing may be used for instance in a spraying mechanism for conveying paint under high pressure from a pump to a flow gun, or used for instance in conjunction with fluid operated motor units in machinery, and for conveying actuating fluid to and from such motor units, and as for instance as used in earth moving mechanisms.

These problems include the desirability of providing a coupling or fitting which will positively adhere to the associated end of the tubing product through the complete range of pressures to which the tubing product is designed to carry, and without movement of the coupling off of or with respect to the end of the tubing. These problems are considerably aggravated when the tubing product and associated coupling or fitting are utilized under a wide range of varying temperature and pressure conditions, and generally as the temperature increases, the ability of the coupling to remain in fixed relation on the associated end of the tubing product diminishes.

Accordingly, an object of the invention is to provide an improved fitting or coupling adapted for use wth a flexible tubing product, and which provides for positive attachment of the fitting in secured relation to the tubing product.

Another object of the invention is to provide a fitting of the latter type which is relatively simple in nature, can be mass produced, which can be readily assembled with the tubing or hose proper, and which gives highly improved durability to the tubing and fitting assembly.

A more specific object of the invention is to provide a fitting of the above type which comprises an elongated insert member having an external toothed configuration and a coacting, deformable ferrule or shell member having an interior toothed configuration, and with the toothed configurations on the insert member and on the ferrule member coacting when the fitting is mounted on the associated end of the tubing, to deform the tubing into positive interlocked relation with such toothed configurations, and in a manner to prevent movement of the fitting off of or with respect to the tubing, under a wide range of temperature and pressure conditions.

A further object of the invention is to provide a novel method of producing a fitting made in accordance with the invention, and attaching it to the tubing product.

Other objects and advantages of the invention will be apparent from the following description taken in conjunction with the accompanying drawings, wherein:

FIG. 1 is an enlarged, side elevational view of the insert member of the fitting;

FIG. 2 is an end elevational view of the insert member of FIG. 1 taken generally from the right hand end of FIG. 1;

FIG. 3 is an enlarged, generally fragmentary, vertical sectional view illustrating the configuration of the teeth or circumferential bands on the insert member of FIGS. 1 and 2;

FIG. 4 is an enlarged, partially sectioned, elevational view of the ferrule or sleeve member of the fitting, and illustrating the internal toothed configuration of such ferrule member;

FIG. 5 is a side elevational, partially sectioned view of the fitting member of the invention, as assembled on a thin wall composite tubing product, and illustrating the deformation of the walls of the tubing product by the toothed configurations of the insert member and the ferrule member;

FIG. 6 is a reduced size, generally diagrammatic, sectional view of a mandrel inserted in the fitting assembly during the attaching operations to the end of a piece of tubing;

FIG. 7 is a side elevational, partially sectioned view of a modified form of insert member for a fitting produced in accordance with the instant invention;

FIG. 8 is a fragmentary, vertical sectional view, illustrating an enlarged end of the insert member of FIG. 7, which has been expanded by means of a mandrel or the like, for fitting into a complementary recess in an associated ferrule member;

FIG. 9 is a vertical sectional view of the ferrule member adapted for assembly with the insert member of FIGS. 7 and 8;

FIG. 10 is a partially sectioned elevational view of the assembled insert and ferrule members of FIGS. 7 to 9, to form the fitting of the invention, and as mounted on an end of a thin walled tubing product in attached relation therewith; in dot-dash lines there is illustrated a mandrel for use during crimping of the ferrule member;

FIG. 11 is a fragmentary, vertical sectional view of a further modified form of insert member adapted for use with the ferrule member of FIG. 9 and as mounted on a thin walled tubing product.

Referring now again to the drawings, and in particular to FIG. 5 thereof, there is shown a piece of flexible tubing T which is attached to the fitting of the invention. Such tubing may be of the composite structure aforementioned, including the relatively thin walled inner tube 10, the layer or layers of braided reinforcing material 12 preferably disposed in tensioned relation about the inner tube 10, and an outer sheath 14 of elastomeric plastic material deposited or extruded on the reinforcing material, to form a high strength flexible composite tubing product, adapted for transmission of relatively high pressures under a wide range of temperature and pressure conditions.

Now in accordance with the instant invention, the fitting or coupling comprises an insert member 16 and a ferrule member 18 adapted for coacting relation on the end of the piece of tubing T, and adapted to deform the wall of the tubing therebetween, so as to positively hold the fitting in assembled relation with the tubing. The insert member 16 comprises an elongated shank portion 20 and a head portion 22 with a passageway 24 extending axially through the insert member. The head portion 22 may include the threaded section 26 for coupling the fitting to one of the prior mentioned mechanical devices, such as a pump or flow gun, and the integral nut section 26a for convenient grasping and turning of the insert member. The shank is provided with a flange or collar 28 disposed adjacent the head portion and defining a groove 30 intermediate the head portion and the flange 28, for a purpose to be hereinafter set forth. Portion 30a of the shank is preferably of an increased wall thickness, as shown, to strengthen the juncture of the head and shank against bending loads. The shank is preferably slightly tapered toward its free end, with the latter being swaged, as at 31, to facilitate the insertion of the insert into the tubing, and as will be hereinafter described in detail.

The shank is also provided with a plurality of axially spaced toothed portions 32 which extend circumferentially about the shank and which are adapted to coact in interlocked relation with the inner tube 10 of the composite tubing product T, to hold the fitting in assembled relationship with the tubing. As can be best seen in FIGS. 3, the toothed portions 32 have a rounded configuration at their edges and at their roots, and as at 40, to aid in preventing cutting of the inner tube 10 by the insert member upon attachment of the fitting to the tubing. The height H of the tooth portions are preferably about one-half the wall thickness of the inner tube 10 of the composite tubing, to prevent any tendency of the insert member from cutting through the wall of the inner tube. For instance, with an inner tube 10 having a nominal wall thickness of 0.015 inch, the height H would be approximately 0.0075 inch. However, such height will still provide for substantial embedding of the tooth forms 32 in the wall of the inner tube in the finalized assembly, to prevent movement of the insert off of or with respect to the end of the tubing.

Ferrule member 18 comprises a sleeve-like element open at both ends thereof and preferably made of a steel-lead alloy or like conveniently deformable material, so that the ferrule element can be readily crimped or swaged onto the associated end of the tubing. The ferrule member has the internal toothed configuration 40 illustrated with such tooth portions being spaced lengthwise of the ferrule member and extending circumferentially about the interior thereof. The forward end of the ferrule member is provided with a shoulder portion 42 which is adapted to be received in the aforementioned circumferentially extending slot 30 in the insert member, when the ferrule member is crimped or deformed onto the end of the tubing, to form the finalized fitting for the tubing. It will be noted that alternate teeth of he ferrule member are of a lesser height than the adjacent teeth and that the teeth 32 on the insert member 16 are so arranged so as to be in confronting relation with the lesser height of teeth 40 on the ferrule member, in the assembled condition of the fitting. Thus, when the hose or tubing is inserted in the ferrule member and the ferrule member is crimped or swaged onto the tubing end, the wall of the tubing is alternately stressed into definite interlocking coaction with the recesses between the tooth portions. The rearwardmost tooth portion 44 of the ferrule member has a curved exterior root 46, and the ferrule member is extended rearwardly of the teeth to provide smooth, cylindric-like interior surfaced collar section 48 on the ferrule member. Such collar section is adapted to clasp the exterior of the underlying tubing and helps to aid in preventing movement or twisting of the tubing with respect to the ferrule member in the assembled condition of the fitting on the tubing, and thus prevents cutting and consequent splitting of the tubing at the teeth of the ferrule member.

In assembling a piece of tubing T with the fitting, the ferrule member is first inserted over the end of the tubing and with the interior passageway 50 through the ferrule member being of adequate dimension to provide for ready movement of the tubing end into the ferrule member. The insert member 16 is then inserted into the inner tube and with the generally tapered free end of the insert member facilitating movement of the shank portion thereof into the inner tube 10 of the tubing. In the assembled condition of the tubing with the ferrule member and the insert member, the shoulder portion 42 on the ferrule member is disposed in abutting relation with the nut portion 26a of the insert member. The ferrule member is then crimped or swaged circumferentially thereof and lengthwise therealong, and as at 55, whereby the wall of the ferrule member is caused to move inwardly causing embedding of the wall of the inner tube member 10 with the toothed configuration 32 of the insert member and causing deformation of the outer sheath 14 of the tubing into the spaces or grooves 58 between the teeth of the ferrule member. The volume of the cavity between the ferrule and the insert members is so provided that all of the sheath portion except .002 or .003 of an inch necessary for the protection of the underlying reinforcing braided material 12 is accommodated in the grooves of the ferrule member. This virtually eliminates any slip due to cold flow of the sheath material, which heretofore has been a major cause of failure in end fittings. It will also be seen that the braided material 12 is trapped in such a manner that it is alternately stressed first one way or one radial direction, and then the other, between the mating tooth-like contours on respectively the ferrule member and the insert member which grip it, and further interlock the fitting to the tubing. It will be seen that it would be extremely difficult for the braided material to contract while sliding across these alternately larger and smaller diameter annular rings 40 forming the toothed configuration of the ferrule member, if axial pressure is applied to the fitting assembly in an attempt to strip it off the tubing. The braided material is thus forced up into the grooves 58 of the shell or ferrule member in such manner that it cannot be easily deformed or straightened out, and accordingly, this provides a second positive form of interlocking the braid in the fitting so that under high end loads, it will be extremely difficult to withdraw the braid and tube structure from the fitting assembly. The collar 28 forces the end of the tubing up into the forwardmost groove 58 in the ferrule, to obtain a positive locking of the tubing to the fitting assembly.

It will be seen that the annular grooves 60 of the insert member posses relatively wide longitudinally extending surfaces which provide wide sealing surfaces which are not sharp, and accordingly prevent any fluid seepage between the insert member and the coacting inner tubular member. The total interference in the tubing interior after the attaching or crimping operations, in the embodiment illustrated in FIG. 5, is approximately 14.5%, or in other words, the passageway through the inner tube 10 of the tubing has been diminished by that amount by having the insert member disposed therein.

Before swaging or crimping of the ferrule member onto the end of the associated tubing T, a mandrel M (FIG. 6) is preferably inserted into the passageway 24 in the insert member, and with such mandrel M preferably terminating inwardly of the rearward end of the insert member, and then the crimping or swaging operation is carried out to deform the walls of the tubing into interlocking relation with the toothed configurations on the insert and ferrule member respectively, as aforedescribed. Termination of the inner end of the mandrel inwardly of the inner end of the insert member insures that there will be no sharp edge which might cut the inner tube 10 of the tubing assembly during the attaching operations. After the attaching operation, the mandrel is withdrawn and the fitting is permanently attached to the composite tubing.

Referring now to FIG. 7, there is shown a modified form of insert member 62 comprising an elongated tube 64 having tooth or ring forms 64a on its exterior surface generally similar to that aforedescribed in connection with the first described embodiment of the invention. However, the insert member in this embodiment has no head portion, as in the first described embodiment.

The ferrule member 65 for use with the insert member 62 comprises a body portion 65a having an interior toothed configuration 66 similar to that aforedescribed in connection with the first described ferrule embodiment, but in addition there is provided an integral head portion 67 having the nut section 67a thereon and having an exteriorly threaded section 67b projecting forwardly from the nut section 67a. An axially extending passageway 68 is provided through the threaded and nut portions 67b and 67a and communicates with the interior of the body portion 65a of the ferrule member. There is also provided a counterbore 69 defining shoulders 70 in passageway 68.

The insert member in this embodiment may be formed of steel or like material, and the forward end of such insert member is enlarged or expanded as by punching or spinning, and as at 72 (FIG. 8) prior to insertion in the ferrule member. The insert member is then copper plated or tin plated or otherwise coated with suitable brazing material, and then the enlarged formed head portion 72 of the insert member is inserted in the counterbore 69 in the ferrule member, to fit snugly within such counterbore. Heat is then applied to the assembly whereby the brazing material on the head 72 of the insert member melts, and brazes the insert member 62 and the ferrule member firmly together into a integral article.

The end of the tubing is then inserted between the insert member and the ferrule member, and the assembly is held in a clamping jaw while a mandrel M' is driven or inserted into the insert member through the passageway therein preferably stopping just short of the inner end of the insert member, and as aforedescribed. The inwardly convergent surfaces 77 on the formed head 72 of the insert member may provide abutments or stops to limit entry of a complementary formed mandrel into the insert member, and thus maintain the free end of the mandrel inwardly of the inner end of the insert member. Then, while the mandrel is held in place, the ferrule member is crimped in the manner aforedescribed in connection with the first embodiment, whereby the walls of the tubing are deformed as illustrated in FIG. 10 and as aforedescribed in conjunction with the first described embodiment, whereby the fitting is permanently held in place upon the end of the tubing. Then the mandrel is withdrawn resulting in a fitting which is securely attached to the end of the tubing without danger of the fitting becoming loose from the tubing or being separated therefrom, irrespective of pressures or temperatures to which the assembly is subjected.

Referring to FIG. 11, there is illustrated an insert member of the general type of FIGS. 7 to 9, but wherein the exterior toothed configuration of the insert member is of more or less wave form 80. This type of tooth configuration facilitates entry of the insert member into the end of the tubing due to the oblique orientation of the tooth surfaces.

It has been found in tests made upon the fitting and tubing assembly and wherein the assembly was heated up to a temperature of 250° F., that such assembly withstood a pressure of 14,000 pounds per square inch, and that the tubing itself burst before any damage was done to the fitting. This represents about five times the normal working pressure of the fitting, and at that test pressure no leakage whatsoever of fluid passing through the tubing occurred.

From the foregoing discussion and accompanying drawings it will be seen that the invention provides a novel fitting or coupling arrangement for attachment to relatively thin walled composite tubing product, and wherein such fitting is permanently attached by crimping or the like to the tubing and in a manner where there is no danger whatsoever of the fitting moving off of the tubing product irrespective of temperature and pressure variations to which the assembly is subjected. Moreover, it will be seen that the invention provides a novel method of assembling the fitting of the invention and to the tubing product.

The terms and expressions which have been used are used as terms of description and not a limitation, and there is no intention in the use of such terms and expressions of excluding any equivalents of any of the features shown or described, or portions thereof, but it is recognized that various modifications are possible within the scope of the invention claimed.

I claim:

1. In a coupling adapted for permanent attachment to an end of a piece of tubing, said coupling comprising, an elongated axially apertured insert member including a shank adapted to be received interiorly of one end of the tubing a deformable ferrule adapted to be received externally of the end of the tubing in encompassing relation with respect thereto and with respect to said shank, tooth means on the interior of the ferrule and on the exterior of said insert member for holding the tubing in positive assembled relation with the coupling upon deformation of said ferrule, means on said insert member adapted for holding coaction with complementary means on said ferrule for preventing relative axial movement with respect to one another, and wherein said tooth means comprises substantially circumferentially extending raised ring means, said raised ring means on said ferrule being of axially spaced alternately greater and lesser interior diameters and the ring means on said insert member being disposed in confronting relation with only the greater interior diameter ring means on said ferrule whereby the tubing material will be alternately stressed first in one radial direction and then the other.

2. A coupling in accordance with claim 1 wherein said ring means on said insert member are of rounded corner configuration at both the crests and roots thereof.

3. A coupling in accordance with claim 1 wherein said ferrule includes a cylindric-like collar portion extending rearwardly from the interiorly ringed section of the ferrule, said collar portion having a smooth inner surface adapted for clasping engagement with the tubing, the interior diameter of said collar portion being greater than the interior diameter of said greater interior diameter ring means.

4. A coupling in accodance with claim 1 wherein said complementary means on said ferrule comprises an inwardly directed shoulder portion and said means on said insert member which is adapted for holding coaction with said complementary means on said ferrule comprises a circumferentially extending recess adapted to receive said shoulder portion therein upon deformation of said ferrule.

5. In a coupling adapted for permanent assembly with an end of a piece of tubing of composite type including a thin walled inner tube of polymeric material having a predetermined wall thickness and a braided reinforcing member disposed in encompassing relation with the inner tube, and an outer sheath of polymeric material encompassing the reinforcing member, said coupling comprising an elongated axially apertured insert member including a shank adapted to be received interiorly of one end of the tube and a deformable ferrule adapted to be received externally at the end of the tubing in encompassing relation with respect thereto and with respect to the shank on said insert member, means on said insert member adapted for holding coaction with complementary means on said ferrule for preventing relative axial movement with respect to one another, tooth means on the interior of said ferrule and on the exterior of said insert member shank for holding the tubing in positive assembled relation with the coupling upon deformation of said ferrule, said tooth means comprising, axially spaced circumferentially extending raised rings, said rings on said ferrule being of alternately greater and lesser interior diameters, the rings on said insert member being disposed in generally confronting relation with only the greater interior diameter rings on said ferrule, said rings on said insert member being of a greater axial width than the axial width of the confronting rings on said ferrule.

6. A coupling adapted for permanent assembly with an end of a piece of tubing, said coupling comprising a deformable ferrule having an axially extending cavity disposed therein commencing at one end of said ferrule, a passageway extending through said ferrule commencing at the other end thereof and communicating with said cavity, a counterbore section in said passageway at its juncture with said cavity, means on said ferrule for attaching the same to another coupling, an elongated axially apertured insert having an expanded head portion formed complementary to and being received in said counterbore section and a cylindrical shank portion extending from said head portion, means securing said head portion of said insert to the defining surface of the counterbore to permanently attach the insert and ferrule together as a unit, said insert shank portion being adapted to be received interiorly of one end of the tubing commencing at the distal end of the insert while the ferrule is adapted to be received externally of the end of the tubing and in encompassing relation with respect thereto, and tooth means on the interior of said ferrule in said cavity and on the exterior of said insert member disposed in generally opposed coacting relation for holding the tubing in positive assembled relation with said coupling upon deformation of said ferrule, said tooth means comprising axially spaced circumferentially extending rings, said rings being disposed throughout substantially the full axial depth of said cavity, said rings on said ferrule being of alternately greater and lesser interior diameters, the rings on said insert being disposed throughout substantially the full axial length of said shank portion and with said rings on said insert shank portion being disposed in generally confronting relation with only the greatest interior diameter rings on said ferrule.

7. In combination a piece of tubing of composite type including a thin walled inner tube of polymeric material having a predetermined wall thickness, a braided reinforcing member encompassing the inner tube, and an exterior sheath of polymeric material encompassing said reinforcing member, and a coupling mounted on the end of said tubing, said coupling comprising an elongated axially apertured insert member including a shank received interiorly of said one end of said tubing, a deformable ferrule received exteriorly of said end of said tubing and in encompassing relation with respect to the tubing and the insert member, means on the ferrule disposed in holding coaction with means on the insert for preventing relative axial movement therebetween, tooth means on the interior of the ferrule and on the exterior of said insert member coacting in opposed relation to deform said tubing therebetween and thus maintain the latter in positive assembled relation with said coupling, said tooth means comprising, substantially circumferentially extending raised ring means, said raised ring means on said ferrule being of axially spaced alternately greater and lesser interior diameters, and the ring means on said insert member being disposed in confronting relation with only the greater interior diameter ring means on said ferrule whereby the tubing material will be alternately stressed first in one radial direction and then the other.

8. The combination in accordance with claim 7, wherein each of the ring means on the insert member is of a greater axial width as compared to the respective confronting ring means on said ferrule.

9. In combination a piece of tubing of the composite type including a thin walled inner tube of polymeric material having a predetermined wall thickness and a braided reinforcing member encompassing the inner tube and an outer sheath of polymeric material encompassing the reinforcing member, and a coupling permanently assembled with the tubing, said coupling comprising an elongated axially apertured insert member including a shank received interiorly of one end of the tubing and a deformable ferrule received exteriorly at said one end of the tubing in encompassing relation with respect thereto and with respect to the insert member shank, means on said insert member disposed in holding coaction with complementary means on said ferrule for preventing relative axially movement therebetween, tooth means on the interior of said ferrule and on the exterior of said insert member shank holding the tubing in positive assembled relation with respect to the coupling upon deformation of said ferrule, said tooth means comprising raised, axially spaced circumferentially extending rings, said rings on said ferrule being of alternately greater and lesser interior diameters, with said rings being disposed throughout substantially the full axial length of the ferrule which is in encompassing relation to the tubing, the rings on said insert member being of greater axial width as compared to the rings on said ferrule and being spaced a greater axial distance apart as compared to the rings on the ferrule, said rings on said insert being disposed in confronting relation with only the greater interior diameter rings on said ferrule, said ferrule including a cylindric-like collar portion extending rearwardly from the interiorly ringed section of the ferrule, said collar portion having a smooth inner surface disposed in clasping engagement with the tubing with the interior diameter of said collar portion being greater than the interior diameter of said greater interior diameter rings on said ferrule

References Cited by the Examiner
UNITED STATES PATENTS

| | | | |
|---|---|---|---|
| 672,244 | 4/01 | Traunfels | 29—157 |
| 730,093 | 6/03 | Chisholm | 29—157 |
| 1,481,341 | 1/24 | Bersted | 285—256 |
| 1,877,433 | 9/32 | Ten Brook | 285—287 |
| 2,024,507 | 12/35 | Brunner | 285—256 |
| 2,092,358 | 9/37 | Robertson | 285—382.4 |
| 2,121,624 | 6/38 | Cowles | 285—256 |
| 2,183,271 | 12/39 | Wendel | 285—287 |
| 2,252,274 | 8/41 | Rossheim | 285—382.4 |
| 2,278,239 | 3/42 | Butler | 285—259 |
| 2,319,586 | 5/43 | Clench | 285—256 |
| 2,463,293 | 3/49 | Mentel | 285—256 |
| 2,562,116 | 7/61 | Nelson | 285—259 |
| 2,816,781 | 12/57 | Woodling | 285—259 |
| 2,865,094 | 12/58 | Press | 285—258 |
| 2,926,029 | 2/60 | St. Clair | 285—256 |

FOREIGN PATENTS

| | | |
|---|---|---|
| 853,232 | 10/52 | Germany. |
| 1,003,337 | 11/51 | France. |
| 1,014,789 | 6/52 | France. |

CARL W. TOMLIN, *Primary Examiner.*